No. 738,508. PATENTED SEPT. 8, 1903.
C. I. WILSON.
IRRIGATING DEVICE.
APPLICATION FILED DEC. 9, 1902.
NO MODEL.

WITNESSES:
Arthur E. Paige
Thos. K. Lancaster

INVENTOR:
Cora Irene Wilson
by her Attorney

No. 738,508. Patented September 8, 1903.

UNITED STATES PATENT OFFICE.

CORA IRENE WILSON, OF PHILADELPHIA, PENNSYLVANIA.

IRRIGATING DEVICE.

SPECIFICATION forming part of Letters Patent No. 738,508, dated September 8, 1903.

Application filed December 9, 1902. Serial No. 134,478. (No model.)

*To all whom it may concern:*

Be it known that I, CORA IRENE WILSON, a citizen of the United States, residing in the city of Philadelphia, county of Philadelphia, State of Pennsylvania, have invented certain new and useful Improvements in Irrigating Devices, of which the following is a specification.

My invention relates to improvements in irrigating devices.

It has for its object to provide a device which may be located inside the upper portion of the walls of a flower pot or similar receptacle, and by means of which, water may be constantly supplied to the upper region of the subsoil contained in the flower pot or similar receptacle. The water being so supplied gradually works its way down through the soil over the roots of plants which may be growing in the flower pot, to the bottom of the flower pot where it is permitted to escape through suitable drainage openings.

The water being supplied to the upper portion of the soil is distributed throughout the soil in the flower pot with greater evenness and with greater thoroughness, by reason of the fact that the usual capillary action is assisted and supplemented by the gravitating action of the water.

The invention resides in the form and specific arrangement of the parts as hereinafter described and specifically pointed out in the claims.

A good form of my device is illustrated in the drawings, in which.

Figure 1:
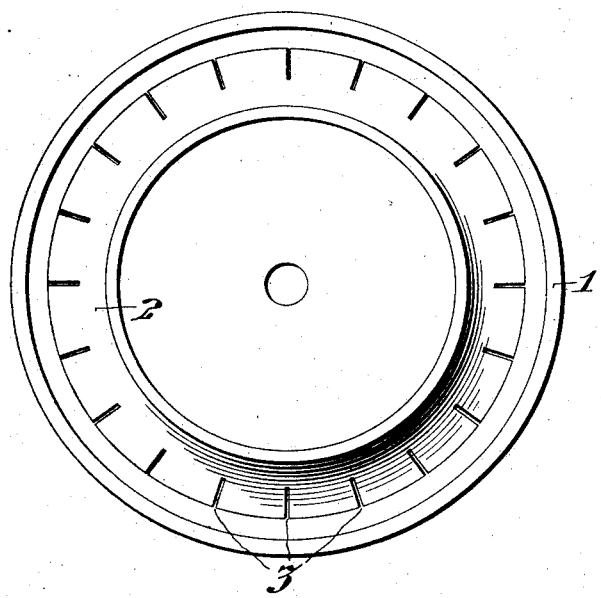
Figure 1 is a plan view of a flower pot illustrating my invention.
Figure 2:
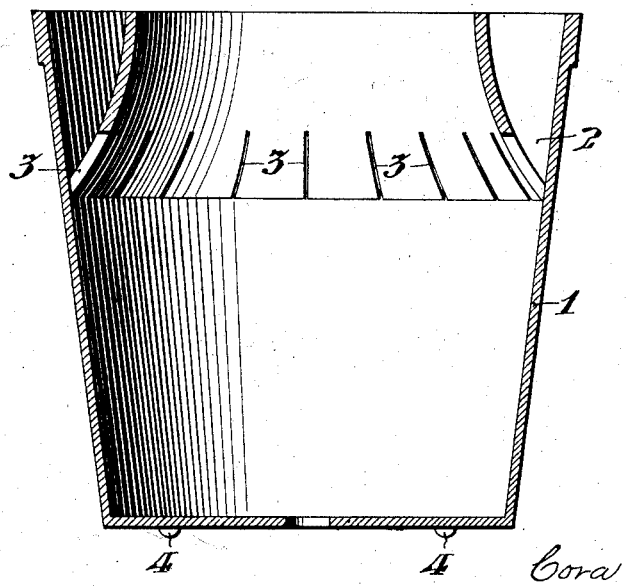
Figure 2 is a central vertical sectional view thereof.

Referring to the drawings,

The numeral 1 designates a flower pot being, in the form shown, of truncated cone shape. The form or contour of the flower pot may be changed, however, to any other form which may be desired.

Secured to the flower pot, inside the upper portions of the walls thereof, is a receptacle or reservoir 2, which is located about the upper region of the subsoil, and which is adapted to receive and to hold water. As illustrated, the said reservoir is integral with the walls of the flower pot, but obviously, the construction may be modified, because, as it is the object of the invention to provide a water holding receptacle inside the flower pot, it is immaterial whether the said receptacle is integral with the flower pot or is positioned within the walls thereof in some other suitable manner.

Within the region of the receptacle or reservoir 2, the flower pot is provided, as clearly shown in the drawings, with elongated slots or openings 3, their object being to permit the passage of water from the receptacle 2 into the interior of the flower pot.

As illustrated, the upper edge of the receptacle or reservoir occupies a position coincident with the plane of the upper edge of the walls of the flower pot 1, whereby the water therein will entirely surround the upper portion of the soil in the flower pot. I do not wish, however, to be restricted to the specific construction illustrated, as it may be found desirable to locate the upper edge of the said receptacle somewhat below the upper edge of the walls of the flower pot.

While the slots or openings are shown in each of the figures as elongated and rectangular in outline, it is to be understood that they may be of any other shape or contour desired and may occupy different positions relative to the water-holding receptacle, without departing from the spirit of my invention.

4 are projections located upon the base of the flower pot by means of which the said flower pot is supported in a slightly raised position, so that the air can have free access to all parts of the flower pot, the base as well as the sides thereof.

By providing means for permitting the air to come into contact with all parts of the surface of the flower pot, the amount of evaporation is increased, whereby the circulation of the water through the soil in the flower pot is increased, and whereby also the soil within the flower pot is maintained in an aerated condition, suitable to the healthy growth of the plants.

The salient features of the invention are embodied in a flower pot which is provided with a water holding receptacle which is located inside the upper portion of the walls of the flower pot, and about the upper region of the subsoil contained in the said flower pot or other similar earth holding device.

Having thus described my invention, I claim—

1. As an article of manufacture, a flower pot having an open topped water holding receptacle, formed integral with the upper portion of the walls of the flower pot and located within said walls, the said receptacle being provided with openings in its sides whereby it is adapted to supply water to the upper region of the subsoil within said flower pot, substantially as described.

2. As an article of manufacture, a flower pot having its base provided with projections, an open topped water holding receptacle formed integral with the upper portion of the walls of the flower pot and located within said walls, the said receptacle being provided with openings through its sides whereby it is adapted to supply water to the upper region of the subsoil within said flower pot, substantially as described.

In testimony that I claim the foregoing as my invention I have hereunto signed my name this 25th day of November, A. D. 1902.

CORA IRENE WILSON.

In presence of—
  S. SALOME BROOKE,
  THOS. K. LANCASTER.